(12) United States Patent
Longland et al.

(10) Patent No.: US 10,909,951 B2
(45) Date of Patent: Feb. 2, 2021

(54) LOCALIZED GLARE REDUCTION ON USER INTERFACES

(71) Applicant: International Business Machines Corporation, Armonk, NY (US)

(72) Inventors: Mark Longland, Old Windsor (GB); Thomas Li, Winchester (GB); Rosanna Lickorish, Southampton (GB); Fraser Iain MacIntosh, Reading (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/248,971

(22) Filed: Jan. 16, 2019

(65) Prior Publication Data
US 2020/0227003 A1 Jul. 16, 2020

(51) Int. Cl.
| | |
|---|---|
| *G09G 5/10* | (2006.01) |
| *G06T 7/70* | (2017.01) |
| *G06T 7/55* | (2017.01) |
| *G09G 3/34* | (2006.01) |
| *H04N 5/57* | (2006.01) |
| *H04N 5/247* | (2006.01) |

(52) U.S. Cl.
CPC .................. *G09G 5/10* (2013.01); *G06T 7/70* (2017.01); *H04N 5/247* (2013.01); *G06T 2207/10016* (2013.01); *G06T 2207/30196* (2013.01); *G09G 2320/066* (2013.01); *G09G 2320/0626* (2013.01); *G09G 2320/0666* (2013.01); *G09G 2320/0686* (2013.01); *G09G 2354/00* (2013.01)

(58) Field of Classification Search
CPC combination set(s) only.
See application file for complete search history.

(56) References Cited

U.S. PATENT DOCUMENTS

| | | |
|---|---|---|
| 5,760,760 A | 6/1998 | Helms |
| 9,262,690 B2 | 2/2016 | Chiu |
| 9,325,948 B2 | 4/2016 | Ma et al. |
| 9,348,502 B2 | 5/2016 | Hwang |
| 9,786,251 B1 | 10/2017 | Gordin et al. |

(Continued)

FOREIGN PATENT DOCUMENTS

| | | |
|---|---|---|
| CN | 105632455 A | 6/2016 |
| CN | 107045864 A | 8/2017 |
| CN | 108270919 A | 7/2018 |

OTHER PUBLICATIONS

Unknown, "Best blue light filter apps for visual comfort: Iris & f.lux", GLARminY, printed Nov. 2, 2018, 23 pages https://glarminy.com/2015/02/06/f-lux-software-reduce-glare-on-computer-screen-sleep-better-and/.

*Primary Examiner* — Wesner Sajous
(74) *Attorney, Agent, or Firm* — Stosch Sabo

(57) ABSTRACT

Techniques for localized reduction of screen glare, the techniques including receiving data from a first camera and a second camera on a perimeter of a display, triangulating a first location of a first light source and a second location of a first user based on the data from the first camera and the second camera. The techniques can further include determining, based on the first location and the second location, that the first user experiences glare from the first light source when viewing the display, and generating a modified screen buffer by modifying pixel values in a glare area of the display. The techniques can further include providing the modified screen buffer to the display.

18 Claims, 12 Drawing Sheets

(56) References Cited

U.S. PATENT DOCUMENTS

| | | | |
|---|---|---|---|
| 9,911,395 B1* | 3/2018 | Townsend | G09G 5/10 |
| 2012/0212510 A1 | 8/2012 | Hewitt et al. | |
| 2012/0327288 A1* | 12/2012 | Gruhlke | G02B 13/001 |
| | | | 348/340 |
| 2015/0077826 A1* | 3/2015 | Beckman | G02B 27/01 |
| | | | 359/238 |
| 2016/0253944 A1* | 9/2016 | Lu | G09G 3/2003 |
| | | | 345/589 |
| 2018/0348338 A1* | 12/2018 | Li | G01S 1/70 |
| 2020/0060767 A1* | 2/2020 | Lang | A61B 34/10 |

* cited by examiner

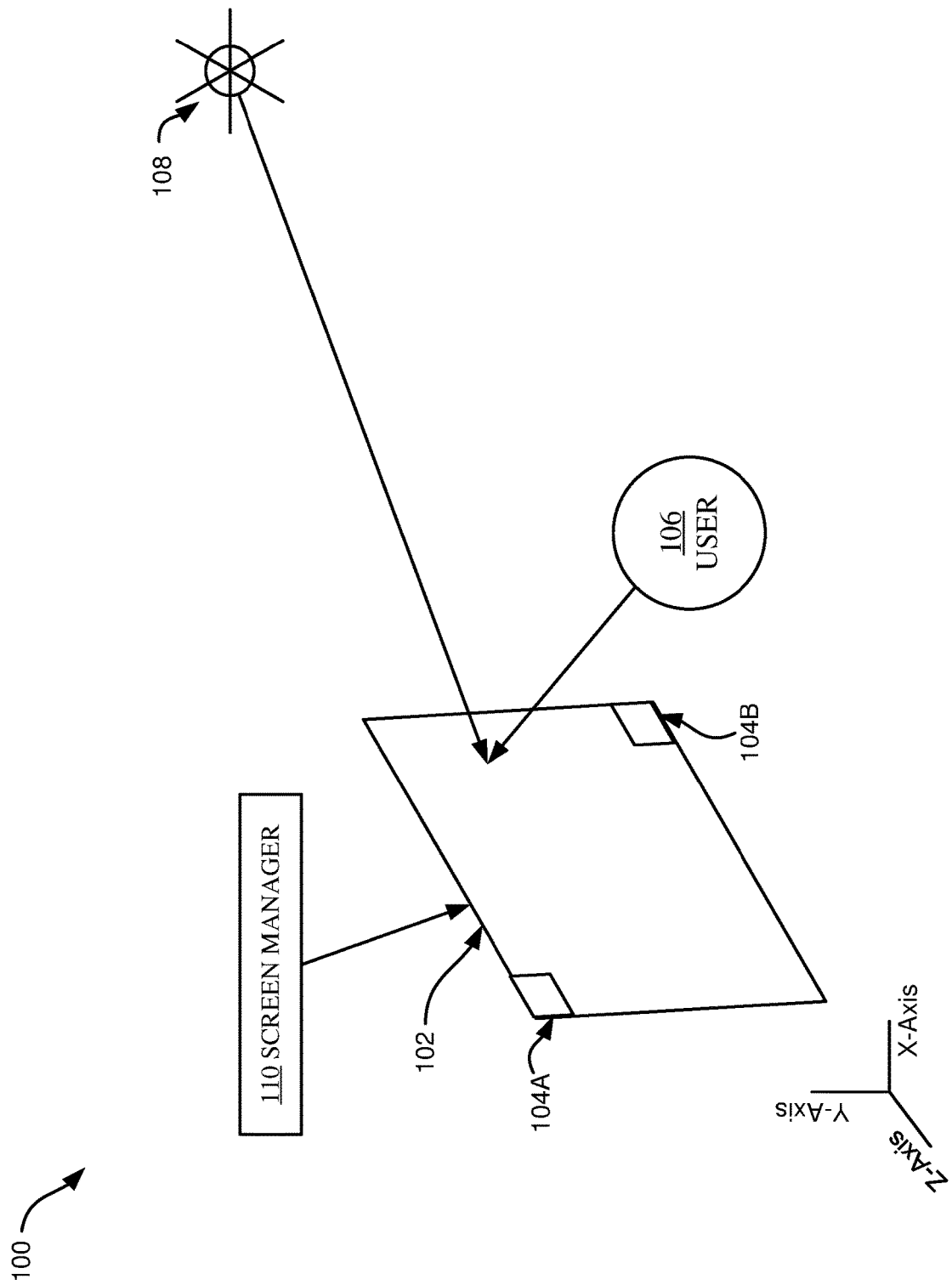

LOCALIZED GLARE REDUCTION ON USER INTERFACES

BACKGROUND

The present disclosure relates to user interfaces, and, more specifically, to reducing glare on user interfaces.

Screen glare reduces usability by limiting a user's ability to clearly see a user interface as a result of a non-uniform distribution of reflected light across the user interface. Screen glare is a common problem and can be caused by overhead lights, lamps, windows, mirrors, and other sources of light having elevated intensity relative to ambient light of an area including the user interface.

SUMMARY

Aspects of the present disclosure are directed toward a computer-implemented method comprising receiving data from a first camera on a perimeter of a display and data from a second camera on the perimeter of the display. The method can further comprise triangulating a first location of a first light source based on the data from the first camera and the second camera. The method can further comprise triangulating a second location of a first user based on the data from the first camera and the second camera. The method can further comprise determining, based on the first location and the second location, that the first user experiences glare from the first light source when viewing the display. The method can further comprise generating, in response to determining that the first user experiences glare, a modified screen buffer by modifying pixel values in a glare area of the display. The method can further comprise providing the modified screen buffer to the display, wherein the display is configured to present a screen according to the modified screen buffer.

Further aspects of the present disclosure are directed toward a system and computer program product with functionality similar to the functionality discussed above regarding the computer-implemented method. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 1 illustrates an example glare reduction system, in accordance with embodiments of the present disclosure.

Figure 2A:
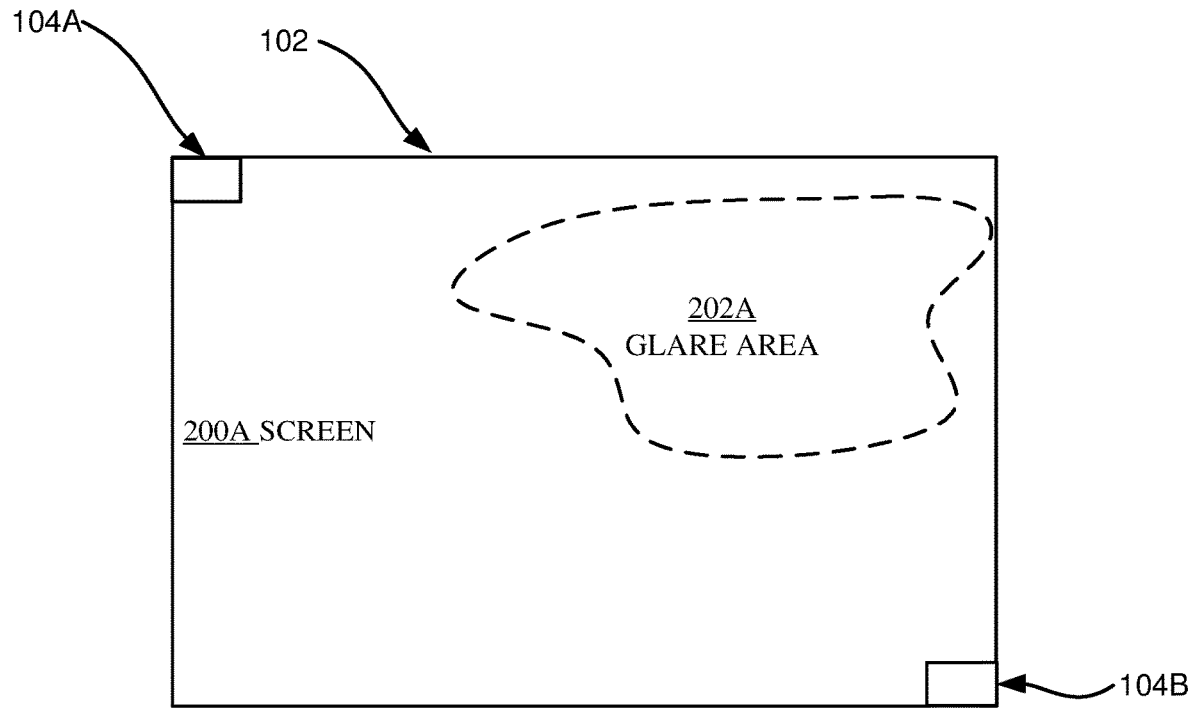
FIG. 2A illustrates a diagram of a user interface exhibiting glare, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward user interfaces, and, more specifically, to reducing glare on user interfaces. While not limited to such applications, embodiments of the present disclosure may be better understood in light of the aforementioned context.

Screen glare reduces usability by limiting a user's ability to clearly see a user interface as a result of a non-uniform distribution of reflected light across the user interface. Screen glare is a common problem and can be caused by overhead lights, lamps, windows, mirrors, and other sources of light having a higher intensity than an area around the user interface.

Furthermore, while changes in user interface position (e.g., orientation, tilt, etc.) can reduce glare for a first user having a first viewing angle, it is impractical to modify a user interface to accommodate numerous people having numerous viewing angles (e.g., a group of people in a first location communicating by video conference on a shared screen with a second group of people in a second location).

While some solutions exist utilizing a physical filter incorporated into a user interface (e.g., a matte finish user interface) or a physical filter subsequently coupled to an existing user interface (e.g., a semi-transparent film applied to a user interface and having a low refractive index), these solutions fail to compensate for localized areas of glare. Furthermore, these solutions can impede visibility of the screen in situations when there is no glare.

The present disclosure overcomes these challenges by using triangulation and/or eye-tracking from at least two cameras coupled to a display and configured to identify locations of users and light sources. This information can be used to modify pixel characteristics in a screen buffer of the display to present a modified screen buffer exhibiting reduced glare at one or more locations on the display for one or more users.

Embodiments of the present disclosure exhibit numerous advantages. For one, the screen buffer is modified rather than the physical display. Modifying the screen buffer provides improved flexibility as modifications can be made to relevant pixels rather than uniformly across the physical display. As a result, aspects of the present disclosure can make dynamic modifications to reduce glare with respect to location (e.g., changing across the screen at any given time) and dynamic modifications with respect to time (e.g., changing as the screen buffer is refreshed each time interval). Thus, aspects of the present disclosure exhibit improved usability, versatility, and adaptability relative to alternatives.

Additionally, aspects of the present disclosure provide numerous particular advantages with respect to various techniques used to determine if a user experiences glare.

A first technique can approximate a reflected ray using a location of the light source, the incidence point of the light source on the display, and an angle of incidence of the light source on the display. The first technique can determine if the reflected ray intercepts any users viewing the display. The first technique is particularly advantageous in situations where there are fewer light sources than users because the computational requirements of the first technique are primarily a function of the number of light sources. The first technique is discussed in more detail with respect to FIGS. 7A and 8A.

A second technique can approximate a reflected view ray using a location of the user, a viewing point of the user on the display, and a viewing angle. The second technique can determine if the reflected view ray intercepts any light sources near the display. The second technique is particularly advantageous in situations where there are fewer users than light sources because the computational requirements of the second technique are primarily a function of the number of users. The second technique is discussed in more detail with respect to FIGS. 7B and 8B.

A third technique uses both the viewing point of the user on the display, and the reflected ray of the light source reflecting off of the display to predict if the user will experience glare at the viewing point. The third technique is particularly advantageous in situations where accuracy and precision are critical, and there is sufficient processing power to manage the increased computational load. The third technique is discussed in more detail with respect to FIGS. 9-10.

Thus, embodiments of the present disclosure exhibit numerous advantages and benefits, including improved computational efficiency with acceptable accuracy in situations involving fewer light sources than users (e.g., the first technique) and situations involving more light sources than users (e.g., the second technique). Furthermore, embodiments exhibit a high degree of accuracy and precision for embodiments presenting time-sensitive or otherwise critical information requiring precise delineations of screen glare for a high degree of usability (e.g., the third technique). Finally, embodiments reduce screen glare by modifying the screen buffer rather than the display, thereby improving flexibility, versatility, and adaptability.

The aforementioned advantages are example advantages, and not all advantages are discussed. Furthermore, embodiments of the present disclosure can exist that contain all, some, or none of the aforementioned advantages while remaining within the spirit and scope of the present disclosure.

Referring now to FIG. 1, illustrated is a block diagram of an example glare reduction system 100, in accordance with embodiments of the present disclosure. Glare reduction system 100 can include a display 102 presenting content to a user 106. Glare reduction system 100 can detect a light source 108 casting light on the display 102. Display 102 can be outfitted with two or more cameras such as cameras 104A and 104B (generically referred to as cameras 104 herein). Cameras 104 can provide data to a screen manager 110.

Screen manager 110 can use the information from cameras 104 to triangulate the position of user 106 and light source 108. In some embodiments, screen manager 110 also calculates an angle of reflection of the light source 108 toward the user. In some embodiments, screen manager 110 also detects a gaze direction of user 106 and correlates it to a respective portion of the screen (e.g., a viewing point). The screen manager 110 can use this information and other information to determine if user 106 may see glare from light source 108 on display 102.

In the event that the screen manager 110 determines that the user 106 is experiencing glare from light source 108 on display 102, then the screen manager 110 can modify pixel information in the display 102 to improve clarity of the portion of the display 102 producing glare from the light source 108 to the user 106. For example, the screen manager 110 can modify pixel brightness values, contrast values, or other values that may improve the ability of user 106 to clearly see the portions of display 102 affected by glare from light source 108.

Display 102 can be any electronic device configured to display information to a user such as, but not limited to, monitors, laptops, tablets, smartphones, televisions, electronic billboards, and so on. Display 102 can be any liquid crystal display (LCD), organic light emitting diode (OLED) display, or a different type of display. In embodiments utilizing a LCD display, the LCD display can include a twisted nematic (TN) panel, a vertical alignment (VA) panel, an in-plane switching (IPS) panel, a quantum dot (QD) panel, and/or a different type of panel.

Cameras 104 can be optical, infrared, thermal, or a different type of camera or combination of cameras. Cameras 104 can be outfitted with appropriate technology to perform eye-tracking, gaze-tracking, and/or similar technology. For example, cameras 104 can be configured to detect reflected infrared or near-infrared light from a user's eyes (e.g., corneal reflections) and use the reflected infrared light to infer gaze characteristics (e.g., line of sight, point of focus, etc.) of the user. Such embodiments can include calculating a vector between a pupil center and a corneal reflection in order to compute a gaze direction.

Light source 108 can be any source of light including, but not limited to direct light from halogen, incandescent, fluorescent, and/or different light bulbs, indirect light from windows, mirrors, and/or other reflections, and/or other sources of light that may cause glare on display 102.

FIG. 1 is illustrated for ease of discussion and is not to be taken in a limiting sense. Each embodiment of the present disclosure does not necessarily require each component discussed in FIG. 1. Likewise, embodiments of the present disclosure can exist that include more or fewer components than those components illustrated in FIG. 1. Furthermore, the configuration of the components in FIG. 1 is not limiting, and embodiments exist that include similar or dissimilar components arranged in similar or alternative configurations than the configuration shown. For example, although two cameras 104 are illustrated in opposite corners, other numbers of cameras 104 arranged in alternative configurations are also possible and fall within the spirit and scope of the present disclosure. Furthermore, although a single user 106 is shown, embodiments exist implementing this solution for multiple users viewing the display 102 from multiple angles. Herein, a single user is discussed for ease of discussion, however, aspects of the present disclosure are also relevant, useful, and applicable to settings and environments where glare must be managed on a single display 102 having numerous viewers from numerous locations. Likewise, although one light source 108 is shown, embodiments exist with more than one light source 108.

Referring now to FIG. 2A, illustrated is an example display exhibiting glare, in accordance with some embodiments of the present disclosure. Display 102 includes a screen 200A and a glare area 202A. As will be appreciated by one skilled in the art, the glare area 202A can change shape, size, and location as a position of the user viewing the screen 102 changes.

Figure 2B:
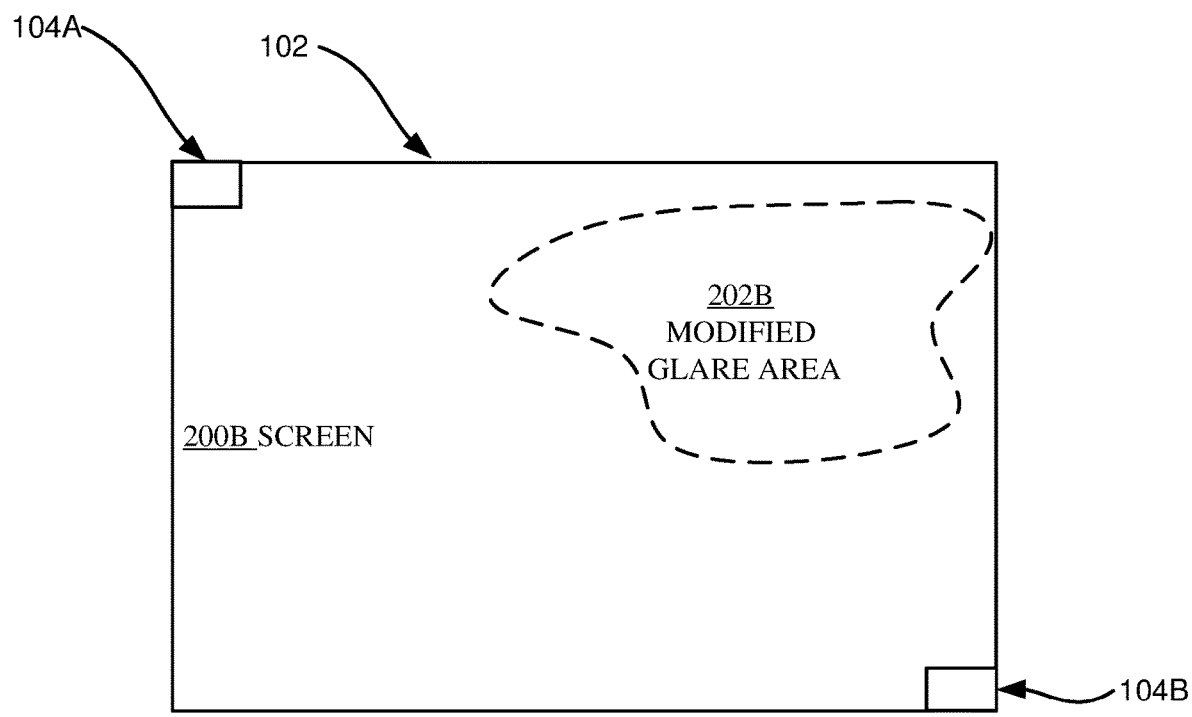
FIG. 2B illustrates a diagram of a user interface with reduced glare, in accordance with embodiments of the present disclosure.

In FIG. 2B, illustrated is an example display 102 exhibiting reduced glare, in accordance with embodiments of the present disclosure. Display 102 includes a first portion of the screen 200B at a first brightness/contrast and the modified glare area 202B at a second brightness/contrast. The second brightness/contrast can be pixel values associated with brightness, contrast, saturation, hue, color, luminance, luma, and/or other values that can improve the clarity of modified glare area 202B relative to glare area 202A. In some embodiments, modified glare area 202B includes increased brightness values and/or increased contrast values for pixels in modified glare area 202B relative to other pixels in screen 200B.

As will be discussed in more detail hereinafter, cameras 104A, 104B can be used to identify locations of a light source and a user 106 and use the identified locations to determine the glare area 202A and generate a modified screen buffer to present a modified glare area 202B improving visibility of the display 102 for a user 106.

Figure 3:
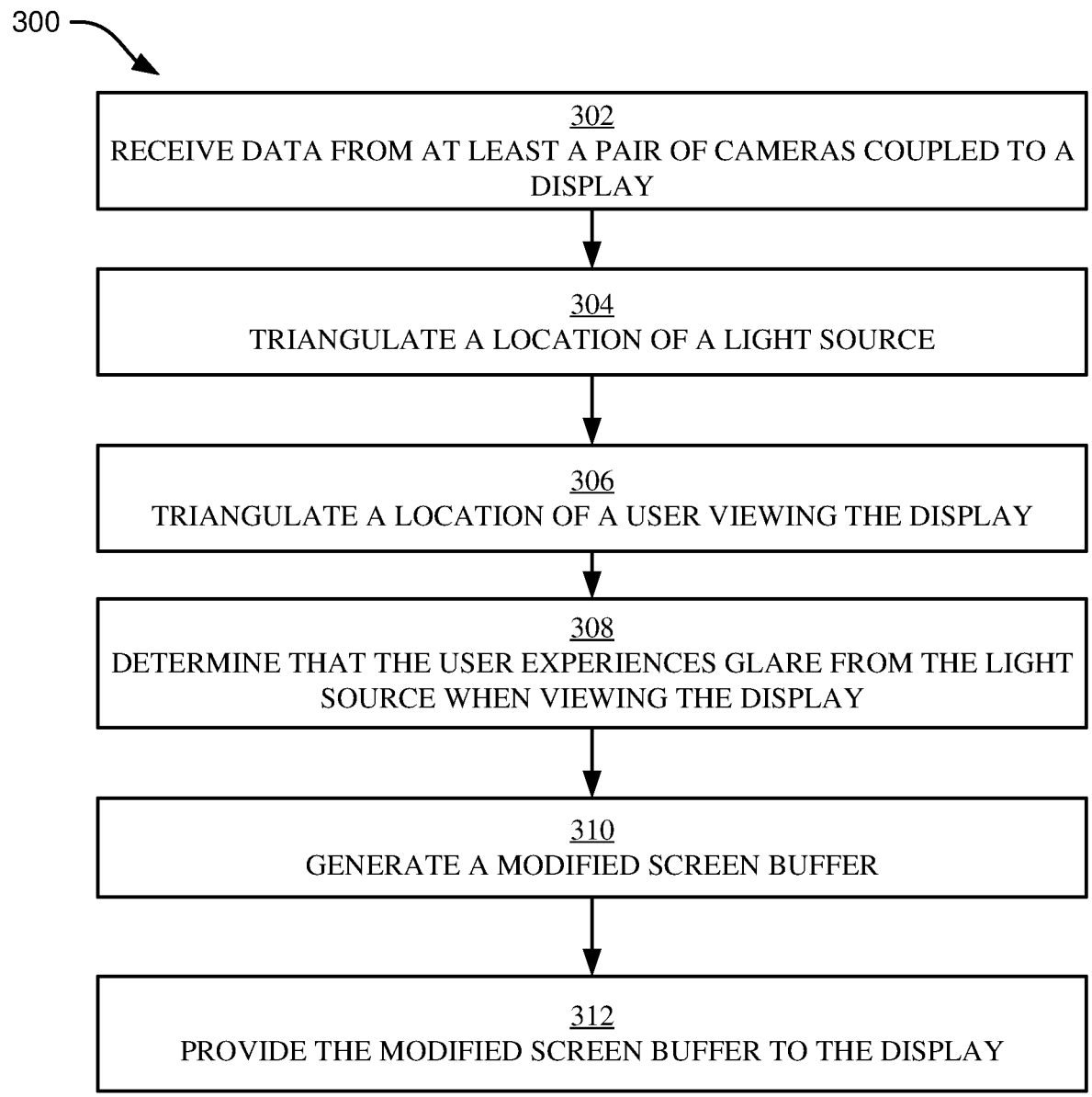
FIG. 3 illustrates a flowchart of an example method for reducing glare on a display, in accordance with embodiments of the present disclosure.

Referring now to FIG. 3, illustrated is a flowchart of an example method for mitigating glare in accordance with embodiments of the present disclosure. The method 300 can be executed by a processor, a screen manager 110, or a different combination of hardware and/or software.

Operation 302 includes receiving data from at least a pair of cameras 104A, 104B coupled to a display 102. In some embodiments, data from more than two cameras is received. In some embodiments, the cameras 104A, 104B are arranged on a perimeter of the display 102, in respective corners of the display 102, and/or in respective corners that are cater-corner to one another. In some embodiments, cameras 104 are integrated into display 102, while in other embodiments, cameras 104 are communicatively coupled to display 102 (e.g., by physical cord or wireless connection) without necessary being physically coupled to the display.

Operation 304 includes triangulating a location of a light source 108, and operation 306 includes triangulating a location of a user 106 viewing the display 102. Both operations 304 and 306 triangulated positions using the data fro the at least two cameras and known locations of the at least two cameras. Operations 304 and 306 are discussed in more detail hereinafter with respect to FIGS. 4-5.

Operation 308 includes determining that the user 106 experiences a glare area 202A from the light source 108 when viewing the display 102. Operation 308 is discussed in more detail hereinafter with respect to FIGS. 6A-6B, 7A-7B, 8A-8B, 9, and 10.

Operation 310 includes generating a modified screen buffer including a modified glare area 202B. Operation 310 can include modifying pixel values (e.g., brightness values, contrast values, saturation values, color values, hue values, luminance values, luma values, transparency values, and so on) within the glare area 202A of the display 102 such that the modified screen buffer exhibits improved visibility at the modified glare area 202B.

Operation 312 includes providing the modified screen buffer to the display 102. The display 102 can be configured to present a screen according to the modified screen buffer and having the modified glare area 202B exhibiting improved visibility relative to glare area 202A.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 4:
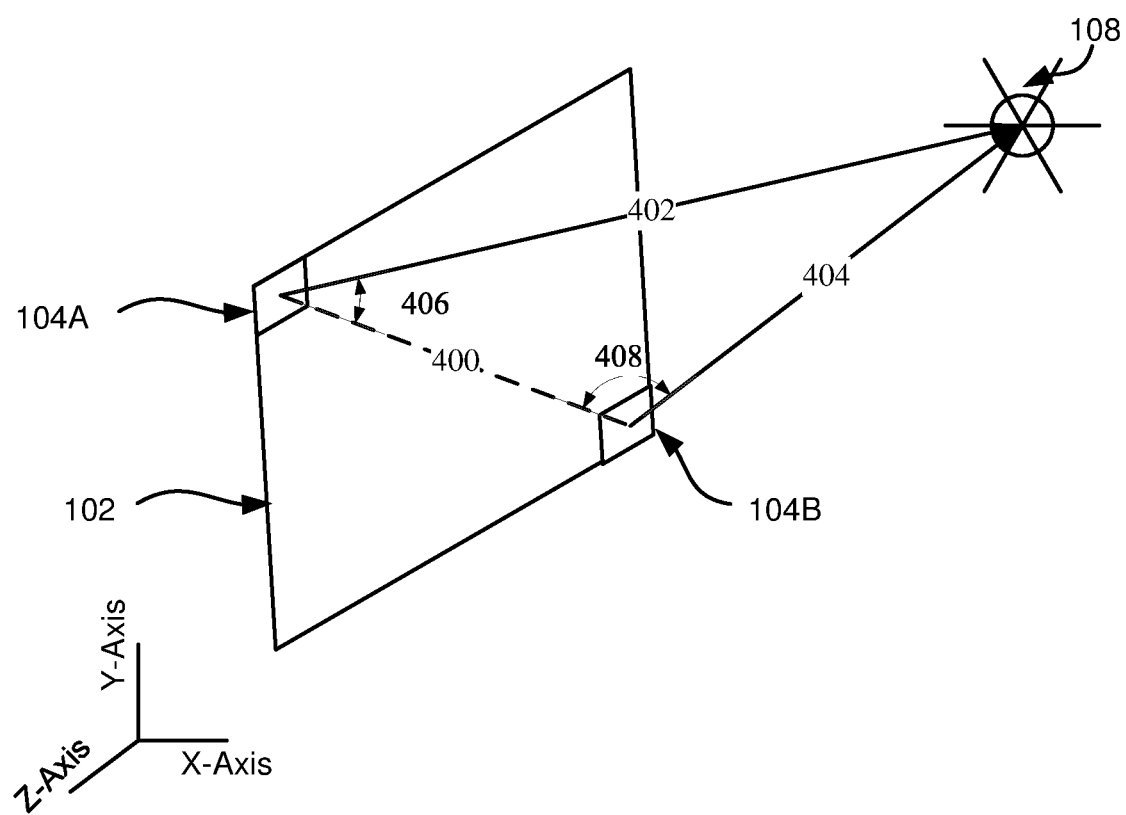
FIG. 4 illustrates an example diagram for performing triangulation, in accordance with embodiments of the present disclosure.

Referring now to FIG. 4, shown is a diagram illustrating triangulation of an object, in accordance with embodiments of the present disclosure. Although light source 108 is shown as the object, FIG. 4 is equally applicable to triangulating a position of other objects such as a user 106.

A separation line 400 intersects the first camera 104A and second camera 104B and can be derived from known coordinates of first camera 104A and second camera 104B at setup. Screen manager 110 can be configured to calculate a first angle 406 between separation line 400 and a first line 402 intersecting first camera 104A and light source 108.

Screen manager 110 can be further configured to measure a second angle 408 between separation line 400 and a second line 404 intersecting the second camera 104B and the light source 108.

In some embodiments, one or both of cameras 104 can be configured to directly measure a distance of first line 402 and/or second line 404 using, for example, a laser range finder. In other embodiments, distances of first line 402 and second line 404 are derived from trigonometric properties and the global coordinates of the first camera 104A, second camera 104B, and light source 108.

Screen manager 110 can use various trigonometric relationships to determine a location of light source 108. In some embodiments, screen manager 110 can decompose any of separation line 400, first line 402, second line 404, first angle 406, and/or second angle 408 into two dimensional components (e.g., an xz-plane component, a yx-plane component, and/or an yz-plane component) and subsequently combine the decomposed two-dimensional components. Such techniques are known in the art and are therefore not elaborated on in depth here.

Figure 5:
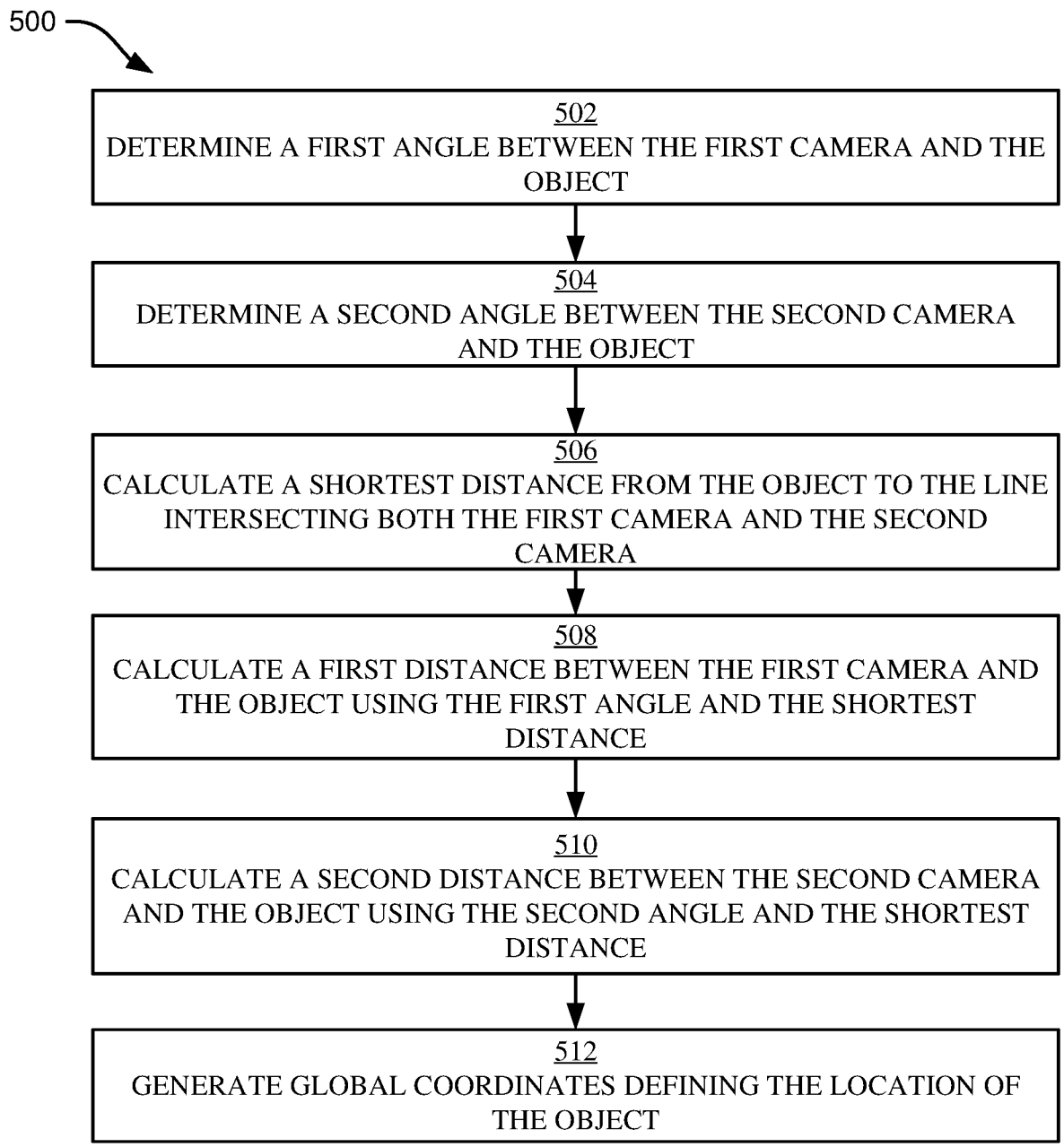
FIG. 5 illustrates a flowchart of an example method for performing triangulation, in accordance with embodiments of the present disclosure.

Referring now to FIG. 5, illustrated is a flowchart of an example method for triangulating a location of an object, in accordance with some embodiments of the present disclosure. The method 500 can be executed by a processor, a screen manager 110, or a different combination of hardware and/or software. In some embodiments, the method 500 is a sub-method of operation 304 and/or 306 of FIG. 3.

Operation 502 includes determining a first angle 406 between the first camera 104A and the object (e.g., light source 108, user 106, etc.). Operation 502 can use a first line 402 connecting the first camera 104A to the object (as derived from video data from cameras 104) and a separation line 400 connecting the first camera 104A and the second camera 104B (as established at setup of the glare reduction system 100) to determine the first angle 406.

Operation 504 includes determining a second angle 408 between the second camera 104B and the object. Operation 504 can use a second line 404 connecting the second camera 104B to the object (as derived from video data from cameras 104) and the separation line 400 to determine the second angle 408.

Operation 506 can include calculating a shortest distance from the object to the separation line 400 intersecting both the first camera 104A and the second camera 104B. Said differently, the shortest distance can be a distance of a line intersecting the object and the separation line 400, existing exclusively in a plane created by the first camera 104A, the second camera 104B, and the object, and being orthogonal to the separation line 400. As will be appreciated by one skilled in the art, calculating the shortest distance creates a right-angle triangle, and the right-angle triangle can be used together with known trigonometric properties to calculate a location of the object relative to the first camera 104A and second camera 104B.

Operation 508 includes calculating the first distance of the first line 402 between the first camera 104A and the object using shortest distance, the first angle 406, and known trigonometric properties.

Operation 510 includes calculating a second distance of the second line 404 between the second camera 104B and the object using the shortest distance, the second angle 408, and know trigonometric properties.

Operation 512 includes generating global coordinates defining the location of the object using at least the first distance of the first line 402, the second distance of the second line 404, the first angle 406, and the second angle 408. The global coordinates can be three-dimensional coordinates using Euclidean coordinates, cylindrical coordinates, spherical coordinates, or a different coordinate system.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 6A:
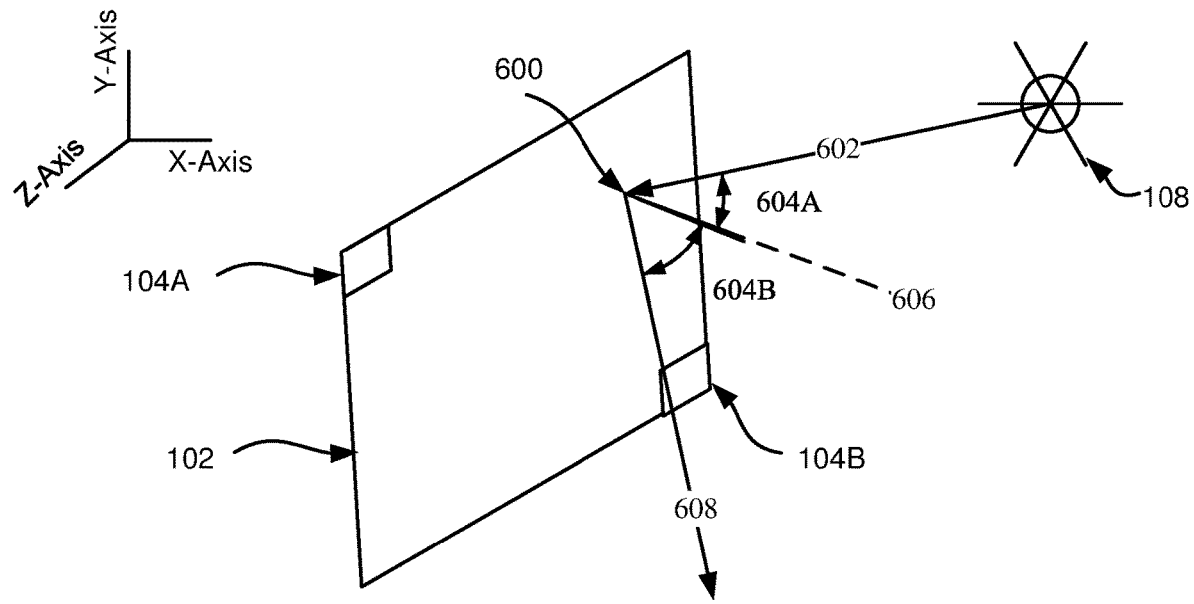
FIG. 6A illustrates a diagram for calculating an incidence point, a reflection angle, and a reflection ray, in accordance with embodiments of the present disclosure.

Referring now to FIG. 6A, shown is a diagram illustrating an angle of incidence, an incidence point, and an angle of reflection, in accordance with embodiments of the present disclosure.

Light from light source 108 can intersect display 102 at an incidence point 600. The line connecting incidence point 600 with light source 108 can be referred to as an incidence line 602. Incidence point 600 and incidence line 602 can be calculated based on data from cameras 104A and 104B after the location of light source 108 is triangulated. The screen manager 110 can determine an angle of incidence 604A defined between the incidence line 602 and a plane of symmetry 606. The plane of symmetry 606 can be orthogonal to the front of display 102 and coincident with the incidence point 600.

Although not shown, in some embodiments, the plane of symmetry 606 can also be defined by two planes including a first plane that is orthogonal to the front of display 102, coincident to incidence point 600, and orthogonal to a side of display 102 and a second plane that is orthogonal to the front of display 102, coincident to incidence point 600, and parallel to the side of display 102 (e.g., the xy-plane and the xz-plane).

The screen manager 110 can use the angle of incidence 604A of the incidence line 602 to predict an angle of reflection 604B and a reflection ray 608. In some embodiments, the angle of reflection 604B is equal in magnitude to the angle of incidence 604A but opposite in sign with respect to the xy-plane and the xz-plane (e.g., the yz-plane is the reflecting surface of the display 102, so the angle of reflection 604B is not symmetric with respect to the yz-plane in this example). The reflection ray 608 represents the path of the reflected glare from light source 108 as reflected off display 102.

As discussed in more detail hereinafter with respect to FIGS. 7A and 8A, the reflected ray 608 can be used to predict glare areas on various portions of display 102 for users 106 viewing the display 102 with a viewing angle approximately aligned with reflection ray 608.

Figure 6B:
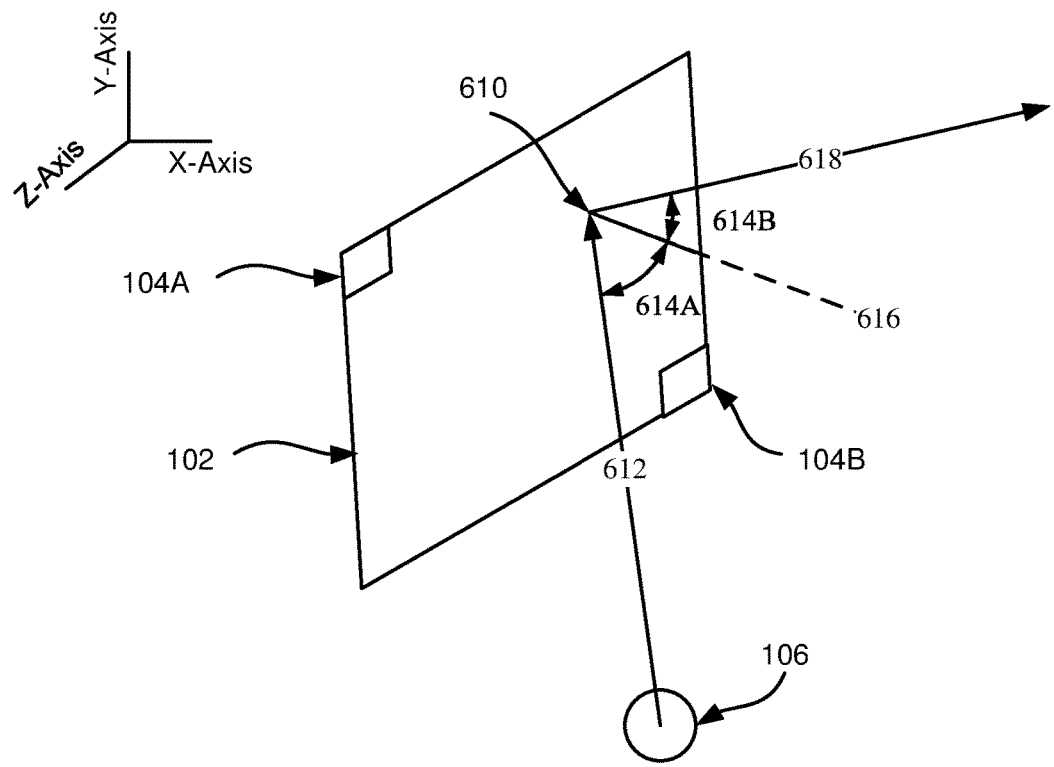
FIG. 6B illustrates a diagram for calculating a viewing point, a viewing angle, and a reflected view ray, in accordance with embodiments of the present disclosure.

Referring now to FIG. 6B, shown is a diagram illustrating a viewing angle, a viewing point, and a reflected viewing angle, in accordance with embodiments of the present disclosure.

Cameras 104 can be configured to detect a gaze direction of user 106 looking at a viewing point 610 on the display 102. A line connecting the user 106 to the viewing point 610 can be referred to as a line of sight 612. Viewing angle 614A is an angle between the line of sight 612 and a plane of symmetry 616 coincident to the viewing point 610 and orthogonal to the front of display 102. Similar to the reflection ray 608 discussed above, FIG. 6B illustrates a technique for approximating a reflected view ray 618 starting from the viewing point 610 and extending out from the display 102 according to the angle of reflection 614B. Said another way, reflected view ray 618 is the mirror image of the line of sight 612 as rotated about the xy-plane and the xz-plane (e.g., a first plane that is orthogonal to the front of display 102, coincident to viewing point 610, and orthogonal to a side of display 102 and a second plane that is orthogonal to the front of display 102, coincident to viewing point 610, and parallel to the side of display 102).

The reflected view ray 618 of FIG. 6B can be useful for determining a user 106 experiences glare at a viewing point 610 of a display 102 if the reflected view ray 618 intersects a light source 108, as discussed in more detail hereinafter with respect to FIGS. 7B and 8B.

Figure 7A:
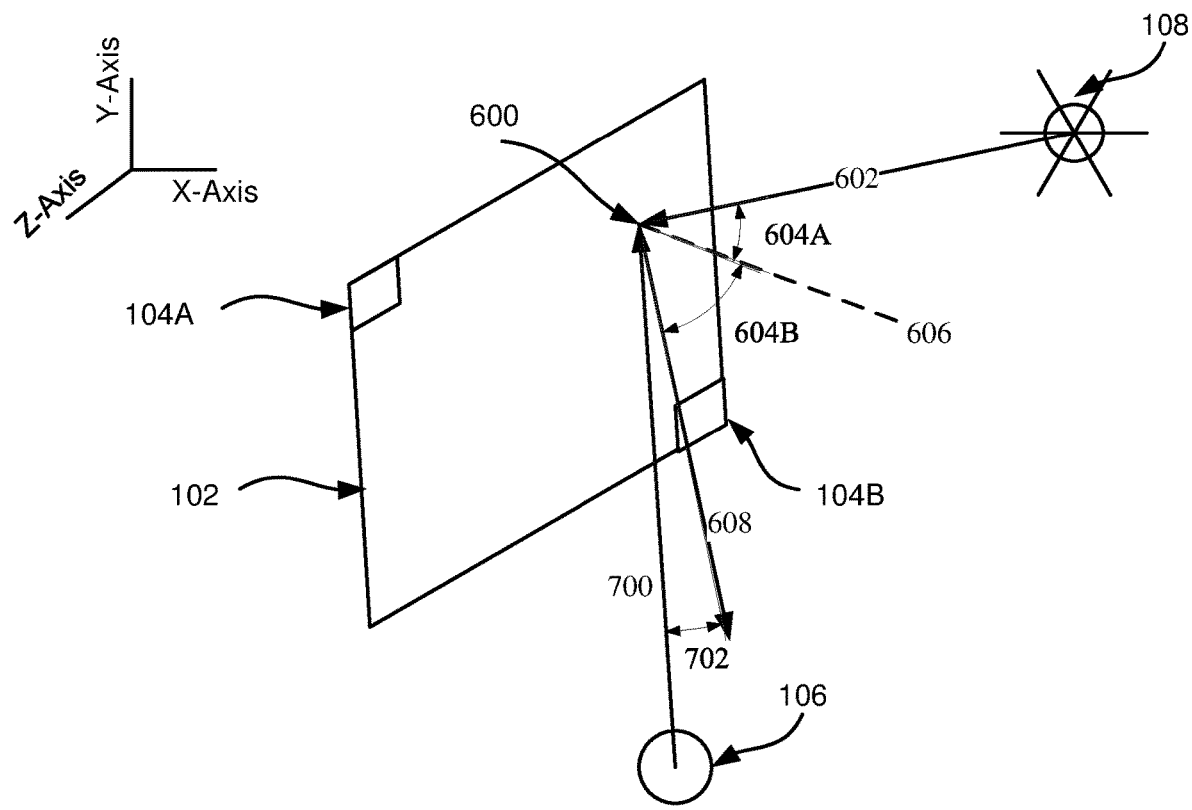
FIG. 7A illustrates a diagram for a first technique for approximating screen glare using the incidence point, the reflection ray, and a location of a user, in accordance with embodiments of the present disclosure.

Referring now to FIG. 7A, illustrated is a first example strategy for predicting glare based on an angle between a reflected ray 608 and a line 700 extending from a user 106 to the incidence point 600. In the event that the angle 702 between the reflected ray 608 and the line 700 between the user 106 and the incidence point 600 is less than a threshold (e.g., ±2°, ±5°, ±10°, etc.), then the screen manager 110 can predict the user 106 will experience glare from light source 108. Line 700 and angle 702 can be calculated based on data from cameras 104.

Advantageously, FIG. 7A illustrates an example strategy that can reduce processing power and increase processing efficiency for situations involving relatively more users 106 and relatively fewer lights 108 (e.g., five users and one light source). Improved efficiencies can be realized by the determining if the reflected ray 608 approximately intersects with any of the many users 106 (e.g., fewer computations) rather than attempting to track eye movements for numerous users 106 and determine if any one of those eye movements intersects a glare area (e.g., more computations).

In fact, the embodiment illustrated in FIG. 7A does not even necessarily require eye-tracking technology. Instead, the line 700 extending from the user 106 to the incidence point 600 simply assumes that if a user 106 looks at that point (regardless of where the user 106 is currently looking), then the user 106 will see glare. This is relevant for smaller screens where a user may be essentially viewing the entirety of the screen at all times. This is also a useful technique for retrofitting existing technology that may not be capable of performing eye-tracking and/or gaze detection.

Figure 7B:
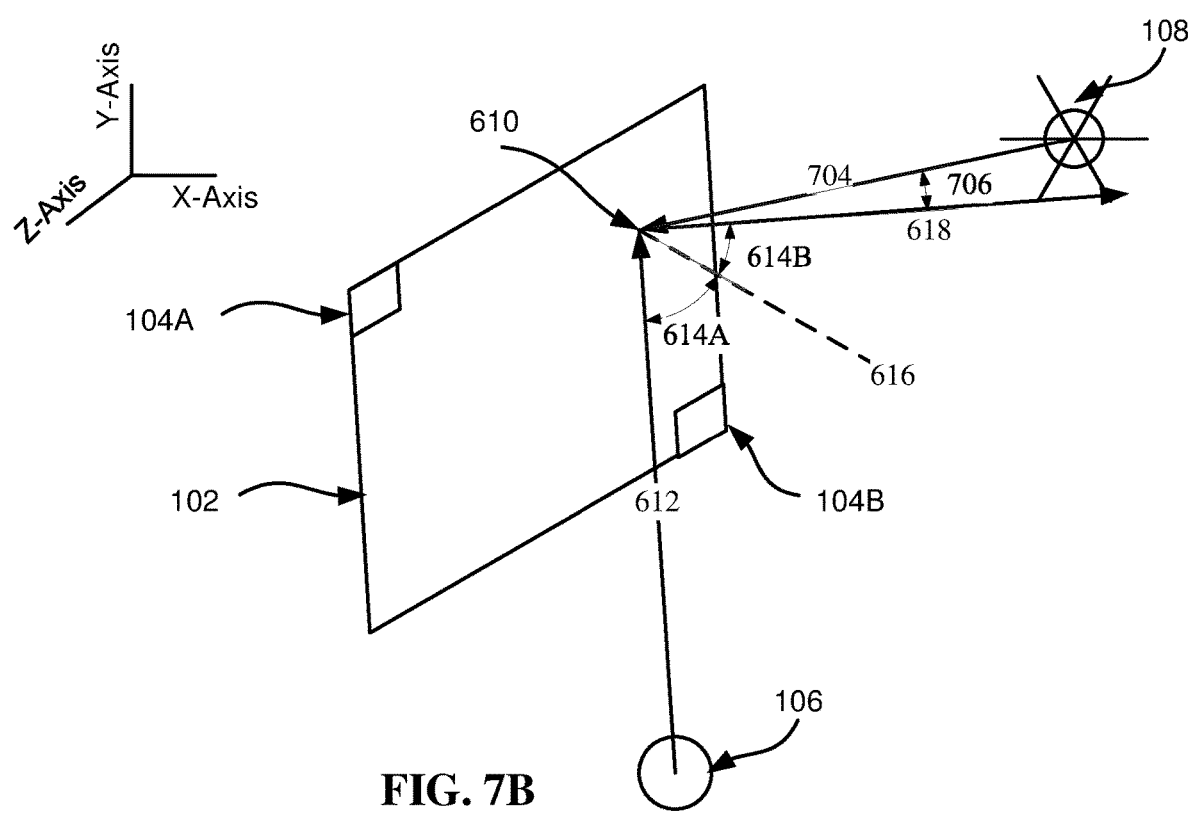
FIG. 7B illustrates a diagram for a second technique for approximating screen glare using the viewing point, the reflected view ray, and a location of a light source, in accordance with embodiments of the present disclosure.

In contrast, FIG. 7B illustrates a second technique for predicting glare that may be especially efficient in situations involving numerous lights 108 and relatively fewer users 106. In FIG. 7B, and consistent with the aspects discussed in FIG. 6B, a viewing point 610 and a line of sight 612 are identified by cameras 104A and 104B (e.g., using triangulation and eye-tracking technology) and a reflected view ray 618 is generated. The screen manager 110 can generate a line 704 connecting the light source 108 to the viewing point 610. The screen manager 110 can then determine if an angle 706 between the line 704 and the reflected view ray 618 is below a threshold (e.g., ±2°, ±5°, ±10°, etc.). This embodiment does not require the screen manager 110 to detect an incidence point 600 and/or reflection ray 608. Instead, the embodiment illustrated in FIG. 7B uses eye-tracking to detect the viewing point 610 and viewing angle 614A, predict a reflected view ray 618, and determine if the reflected view ray 618 approximately intersects any light source 108.

The embodiment of FIG. 7B can exhibit improved processing speed and efficiency in situations where there are relatively fewer users 106 to light sources 108 by determining which users 106 may experience glare from which light sources 108 without necessarily calculating glare from each light source 108.

Both of FIGS. 7A and 7B illustrate embodiments that may produce errors (e.g., false positives, false negatives, etc.) based on the tolerances applied to angles 702 and 706. In some embodiments, such sacrifices in accuracy may be acceptable given the associated improvements in efficiency. Furthermore, the size of light sources 108 and naturally occuring shifts in gaze directions from users 106 generally mean that the tolerances applied to angles 702 and 706 appropriately detect glare. Nonetheless, FIG. 9 (discussed hereinafter) illustrates a third technique utilizing both the incidence point 600 and the viewing point 610 for increased accuracy.

Figure 8A:
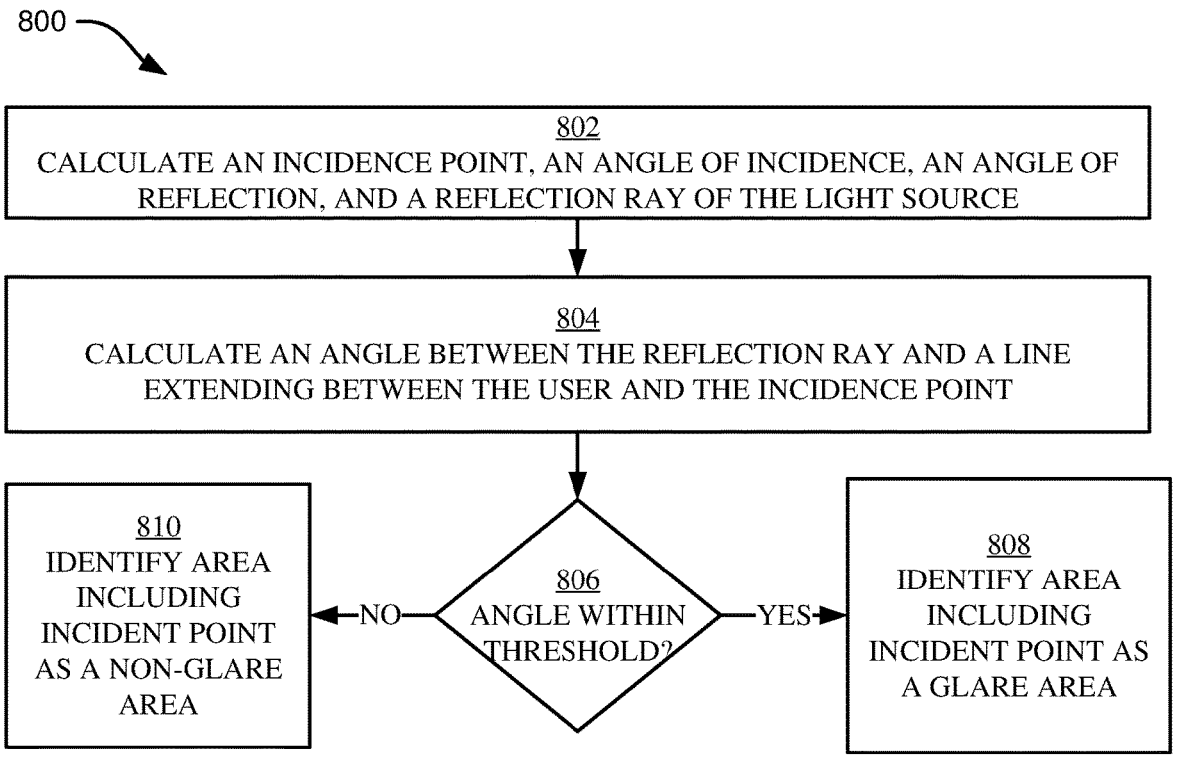
FIG. 8A illustrates a flowchart of an example method for detecting screen glare according to the first technique, in accordance with embodiments of the present disclosure.

First, however, FIG. 8A illustrates a flowchart of an example method 800 for detecting glare using an angle of deviation between a reflection ray 608 and a line connecting a user 106 to the incidence point 600. The method 800 can be executed by a processor, a screen manager 110, or a different combination of hardware and/or software. In some embodiments, the method 800 is a sub-method of operation 308 of FIG. 3.

Operation 802 includes calculating an incidence point 600, an angle of incidence 604A, an angle of reflection 604B, and a reflection ray 608 based on data from cameras 104.

Operation 804 includes calculating an angle 702 between the reflection ray 608 and a line 700 extending from the user 106 to the incidence point 600.

Operation 806 includes determining if the angle 702 is within a threshold (e.g., ±2°, ±5°, ±10°, etc.). If the angle 702 is not within the threshold (e.g., NO at operation 806), the method 800 proceeds to operation 810 and identifies the area including the incidence point 600 as a non-glare area. Alternatively, if the angle 702 is within the threshold (e.g. YES at operation 806), then the method 800 proceeds to operation 808 and identifies the area including the incidence point 600 as a glare area.

Figure 8B:
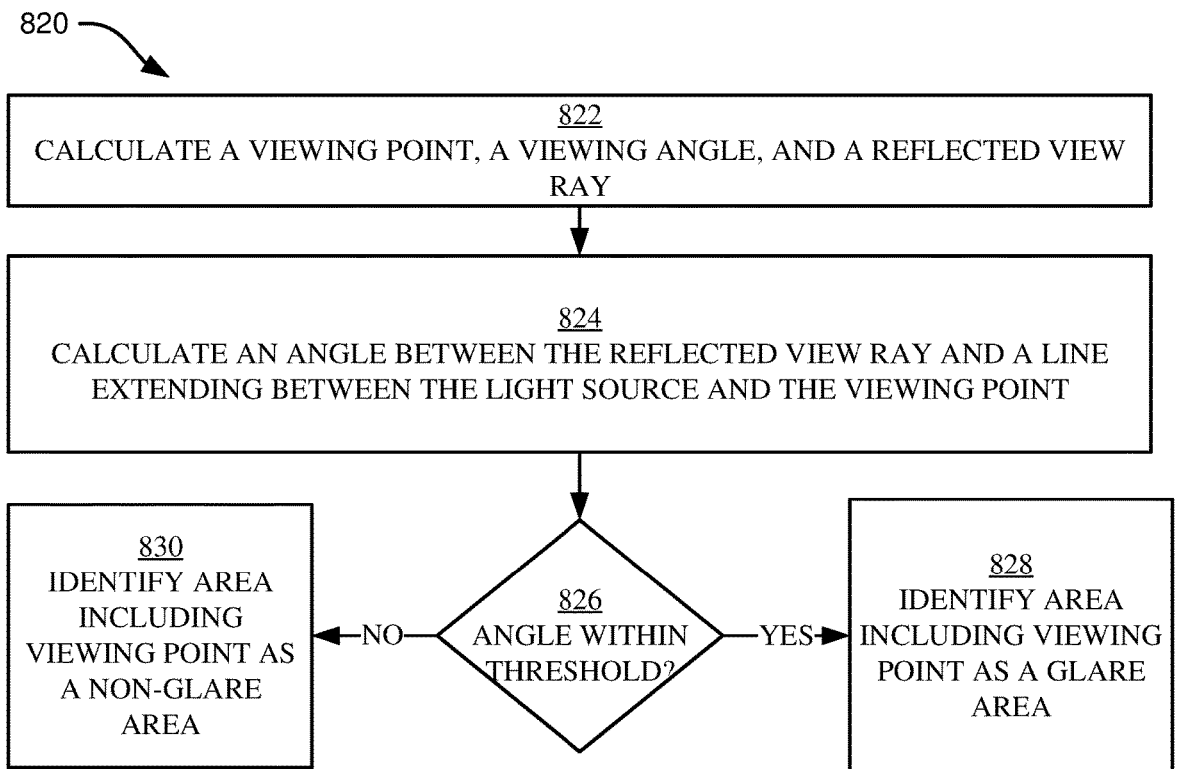
FIG. 8B illustrates a flowchart of an example method for detecting screen glare according to the second technique, in accordance with embodiments of the present disclosure.

Referring now to FIG. 8B, illustrated is a flowchart of an example method 820 for detecting glare using an angle of deviation between a reflected view ray 618 and a line connecting the light source 108 to the viewing point 610. The method 820 can be executed by a processor, a screen manager 110, or a different combination of hardware and/or software. In some embodiments, the method 820 is a sub-method of operation 308 of FIG. 3.

Operation 822 includes calculating a viewing point 610, a viewing angle 614A, a reflected viewing angle 614B, and a reflected view ray 618. Operation 822 can use eye-tracking technology associated with cameras 104 to detect the viewing point 610 and viewing angle 614A. Operation 822 can use known trigonometric relationships to calculate reflected viewing angle 614B and project reflected view ray 618.

Operation 824 includes calculating an angle 706 between the reflected view ray 618 and a line 704 extending between the light source 108 and the viewing point 610.

Operation 826 includes determining if the angle 706 is within a threshold (e.g., ±2°, ±5°, ±10°, etc.). If the angle 706 is not within the threshold (e.g., NO at operation 826), the method 820 proceeds to operation 830 and identifies the area including the viewing point 610 as a non-glare area. Alternatively, if the angle 706 is within the threshold (e.g. YES at operation 826), then the method 820 proceeds to operation 828 and identifies the area including the viewing point 610 as a glare area.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 9:
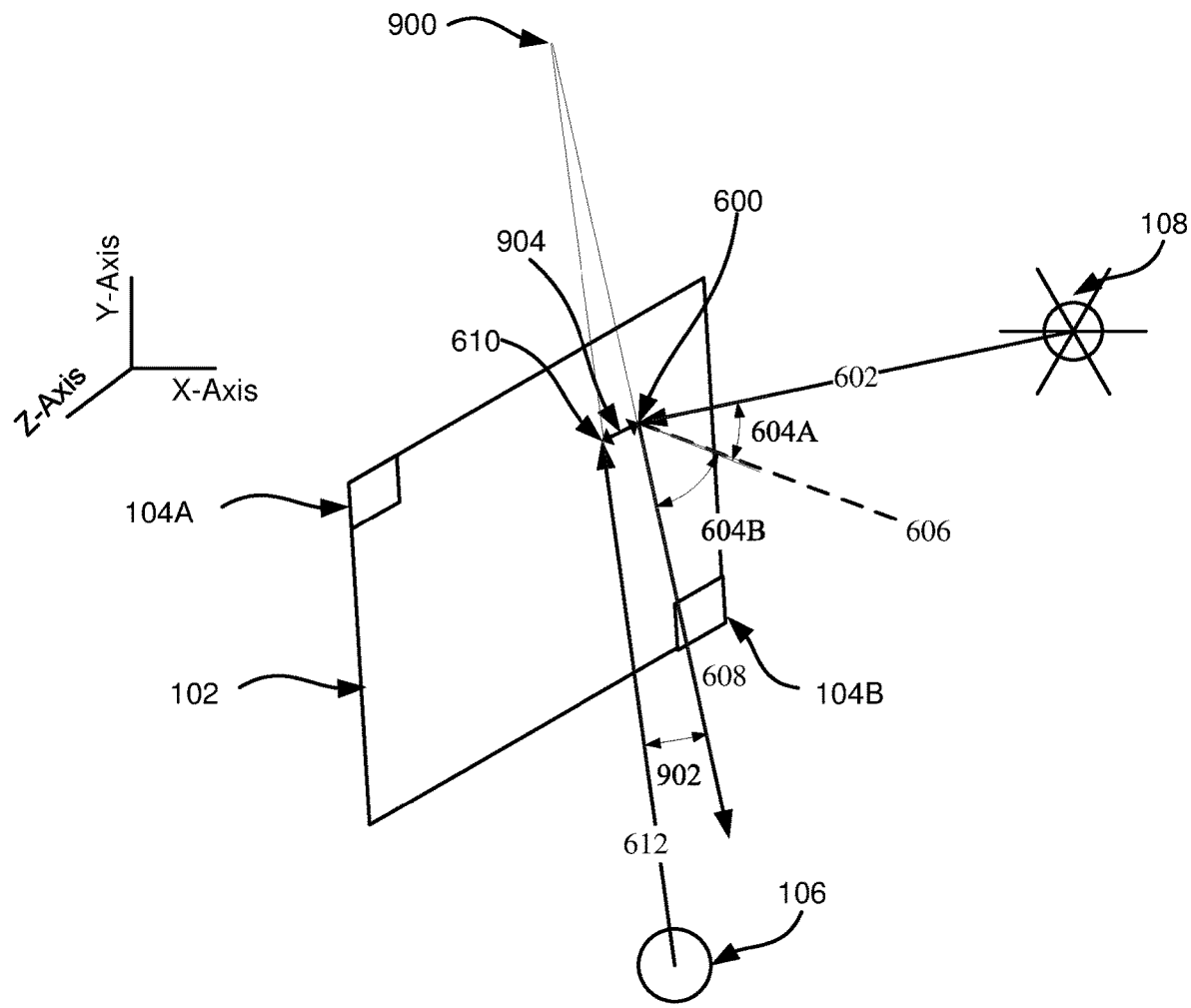
FIG. 9 illustrates a diagram for a third technique for approximating screen glare using the viewing point, the incidence point, the reflection ray, and a location of the user, in accordance with embodiments of the present disclosure.

Referring now to FIG. 9, illustrated is a third technique for predicting glare utilizing both an incidence point 600 and a viewing point 610, in accordance with embodiments of the present disclosure.

As shown in FIG. 9, an angle 902 is calculated between the line of sight 612 and the reflected ray 608 in embodiments where the line of sight 612 and the reflected ray 608 intersect as some point 900.

In embodiments where the line of sight 612 and the reflected ray 608 do no intersect (e.g., they are parallel or skew), then a different strategy for quantifying the relationship between line of sight 612 and reflected ray 608 can be used. As one example, each of the line of sight 612 and the reflected ray 608 can be decomposed into lines on the xy-plane, the zy-plane, and/or the xz-plane. One or more of the decomposed lines may still intersect even if the original lines are skew. Angles of these decomposed, intersecting lines on the various two-dimensional planes can be measured, and these angles can be used to provide an objective estimation of degree of similarity between the line of sight 612 and the reflected ray 608.

Additionally, a distance 904 is calculated between the incidence point 600 and the viewing point 610 on the display 102.

Aspects of the present disclosure utilizing FIG. 9 can both determine if the angle 902 is within an angle threshold (e.g., ±2°, ±5°, ±10°, etc.) and if the distance 904 is within a distance threshold (e.g., one inch, two inches, four inches, etc.). If both thresholds are satisfied, the screen manager 110 can predict that the user 106 will experience glare on screen 102 from light 108, and the screen manager can modify an area including the viewing point 610 and the incidence point 600 to reduce the effects of the glare.

The embodiment illustrated in FIG. 9 can be useful in situations where processing capacity is abundant and accuracy is a primary concern, such as a single user utilizing a large display (or many combined displays) presenting time-sensitive or critical information. By using both the viewing point 610 and the incidence point 600, the third technique discussed in FIG. 9 can improve the accuracy of predicted glare areas and modify the display 102 with increased precision.

Figure 10:
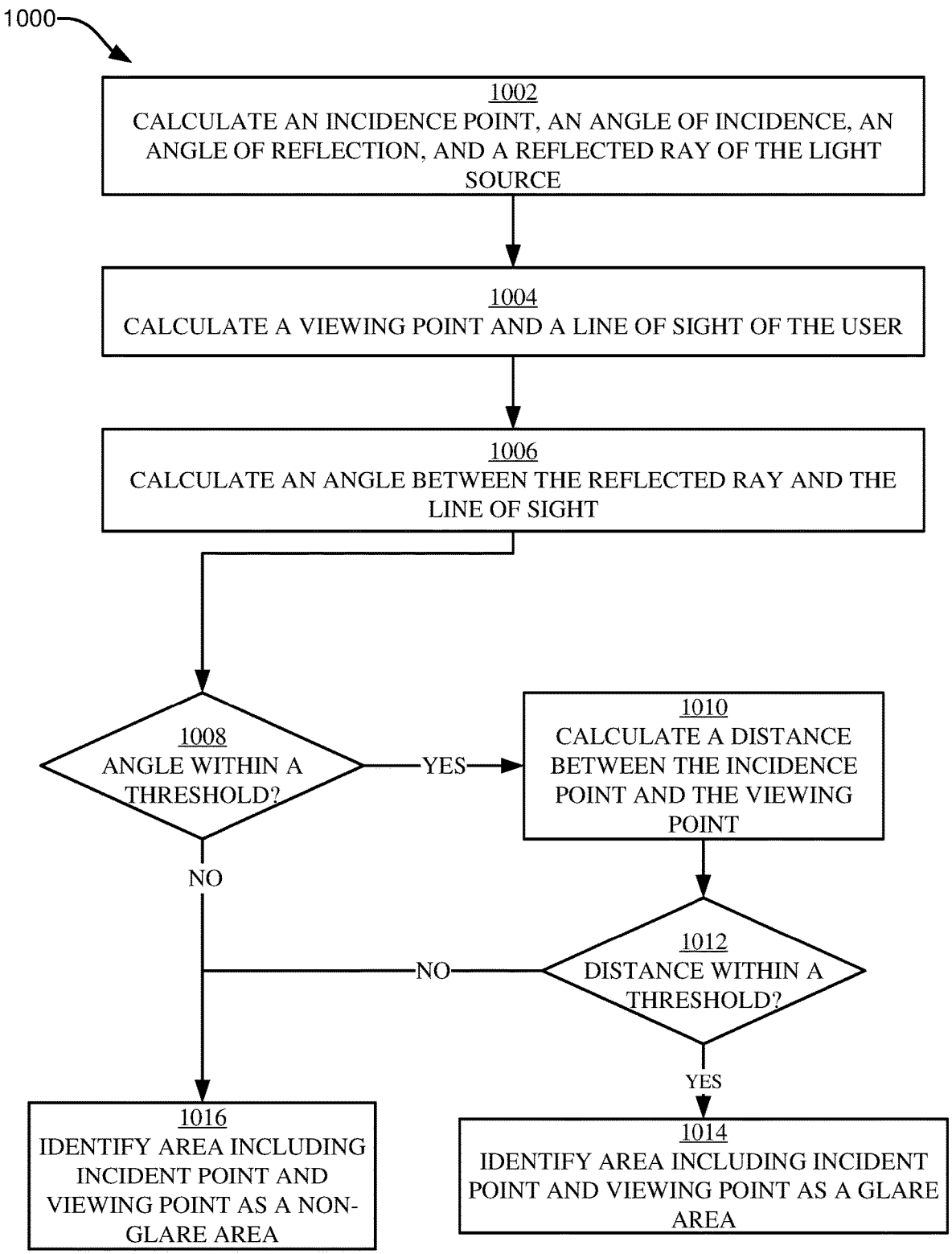
FIG. 10 illustrates a flowchart of an example method for detecting screen glare according to the third technique, in accordance with embodiments of the present disclosure.

FIG. 10 illustrates a flowchart of an example method for reducing glare using both an incidence point 600 and a viewing point 610, in accordance with embodiments of the present disclosure. The method 1000 can be executed by a processor, a screen manager 110, or a different combination of hardware and/or software. In some embodiments, the method 1000 is a sub-method of operation 308 of FIG. 3.

Operation 1002 includes calculating an incidence point 600, and angle of incidence 604A, an angle of reflection 604B, and a reflected ray 608 from a light source 108.

Operation 1004 includes calculating a viewing point 610 and a line of sight 612 of the user 106.

Operation 1006 includes calculating an angle 902 between the line of sight 612 and the reflected ray 608.

Operation 1008 includes determining if the angle 902 is within an angle threshold. If the angle 902 is not within the angle threshold (NO at operation 1008), the method 1000 proceeds to operation 1016 and identifies the area including the incidence point 600 and the viewing point 610 as a non-glare area. If the angle 902 is within the angle threshold (YES at operation 1008), then the method 1000 proceeds to operation 1010 and calculates a distance 904 between the incidence point 600 and the viewing point 610 along the plane created by the display 102.

Operation 1012 includes determining if the distance 904 is within a distance threshold. If the distance 904 is not within a distance threshold (NO at operation 1012), then the method 1000 proceeds to operation 1016 and identifies the area including the incidence point 600 and the viewing point 610 as a non-glare area. If the distance 904 is within the distance threshold (YES at operation 1012), then the method 1000 proceeds to operation 1014 and identifies the area including the incidence point 600 and the viewing point 610 as a glare area.

The aforementioned operations can be completed in orders other than the order shown, and some operations can be completed in parallel with other operations. For example, although FIG. 10 shows the angle threshold determination (operation 1008) occurring before the distance threshold determination (operation 1012), in other embodiments, the distance threshold determination occurs first, or both determinations independently occur in parallel. Additionally, embodiments exist including all, some, or none of the aforementioned operations while remaining within the spirit and scope of the present disclosure.

Figure 11:
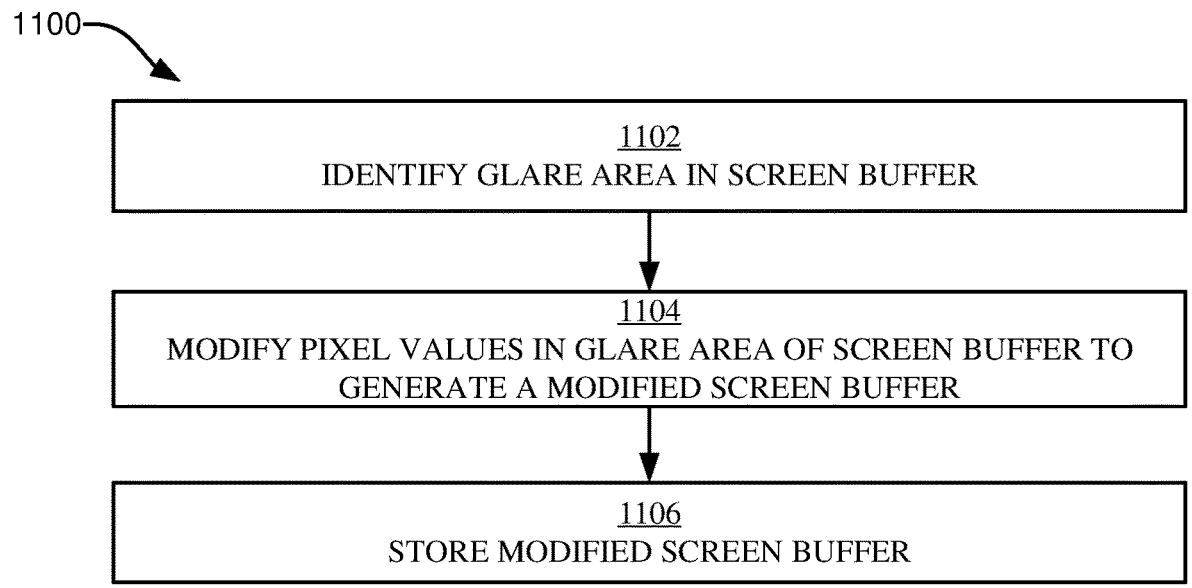
FIG. 11 illustrates a flowchart of an example method for modifying a screen buffer, in accordance with embodiments of the present disclosure.

Referring now to FIG. 11, illustrated is a flowchart of an example method 1100 for modifying a screen buffer, in accordance with embodiments of the present disclosure. The method 1100 can be executed by a processor, a screen manager 110, or a different combination of hardware and/or software. The method 1100 can be a sub-method of operation 310 of FIG. 3.

Operation 1100 includes identifying a glare area 202A in the screen buffer. Operation 1100 can receive coordinates of a glare area 202A on the display 102 (e.g., from operation 308 of FIG. 3), and operation 1100 can include identifying pixels in the screen buffer corresponding to the glare area 202A.

Operation 1104 can include modifying pixel values in the glare area 202A of the screen buffer to generate a modified screen buffer having a modified glare area 202B. Modifying pixels can include, but is not limited to, modifying brightness values, saturation values, color values, contrast values, hue values, luminance values, luma values, transparency values, and/or other values of pixels within the glare area 202A to create a modified glare area 202B.

Operation 1106 can include storing the modified screen buffer including the modified glare area 202B in a tangible storage medium such as a hard disk drive, flash memory, or different storage medium.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 12:
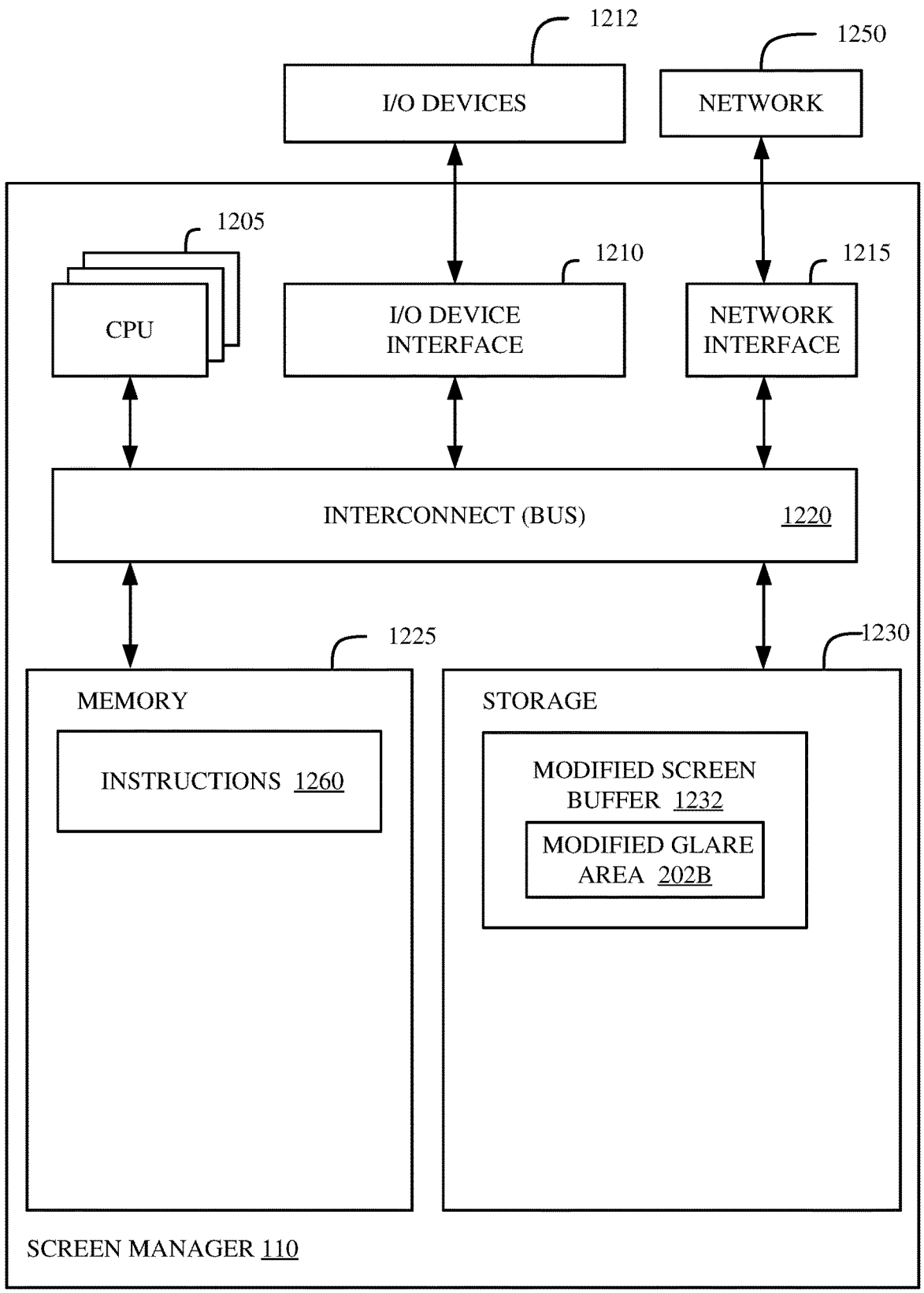
FIG. 12 illustrates a block diagram of an example screen manager, in accordance with embodiments of the present disclosure.

FIG. 12 illustrates a block diagram of an example screen manager 110 in accordance with some embodiments of the present disclosure. In various embodiments, screen manager 110 can perform the methods described in FIGS. 3, 5, 8A-8B, 10, and/or 11. In some embodiments, screen manager 110 provides instructions for the aforementioned methods to a client machine such that the client machine executes the method, or a portion of the method, based on the instructions provided by the screen manager 110.

The screen manager 110 includes a memory 1225, storage 1230, an interconnect (e.g., BUS) 1220, one or more CPUs 1205 (also referred to as processors 1205 herein), an I/O device interface 1210, I/O devices 1212, and a network interface 1215.

Each CPU 1205 retrieves and executes programming instructions stored in the memory 1225 or storage 1230. The interconnect 1220 is used to move data, such as programming instructions, between the CPUs 1205, I/O device interface 1210, storage 1230, network interface 1215, and memory 1225. The interconnect 1220 can be implemented using one or more busses. The CPUs 1205 can be a single CPU, multiple CPUs, or a single CPU having multiple processing cores in various embodiments. In some embodiments, a CPU 1205 can be a digital signal processor (DSP). In some embodiments, CPU 1205 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 1225 is generally included to be representative of a random access memory (e.g., static random access memory (SRAM), dynamic random access memory (DRAM), or Flash). The storage 1230 is generally included to be representative of a non-volatile memory, such as a hard disk drive, solid state device (SSD), removable memory cards, optical storage, or flash memory devices. In an alternative embodiment, the storage 1230 can be replaced by storage area-network (SAN) devices, the cloud, or other devices connected to the screen manager 110 via the I/O device interface 1210 or a network 1250 via the network interface 1215.

In some embodiments, the memory 1225 stores instructions 1260 and the storage 1230 stores modified screen buffer 1232. However, in various embodiments, the instructions 1260 and modified screen buffer 1232 are stored partially in memory 1225 and partially in storage 1230, or they are stored entirely in memory 1225 or entirely in storage 1230, or they are accessed over a network 1250 via the network interface 1215.

Instructions 1260 can be processor-executable instructions for performing any portion of, or all of, any of the methods of FIGS. 3, 5, 8A-8B, 10, and/or 11 and/or the functionality discussed in FIGS. 1, 2A-2B, 4, 6A-6B, 7A-7B, and/or 9. Modified screen buffer 1232 can store a screen buffer configured to present a screen on a display 102 with at least an area of the screen (e.g., modified glare area 202B) having modified pixel values enabling improved visibility for a user 106 despite glare from a light source 108.

In various embodiments, the I/O devices 1212 include an interface capable of presenting information and receiving input. For example, I/O devices 1212 can present information to a user interacting with screen manager 110 and receive input from the user.

Screen manager 110 is connected to the network 1250 via the network interface 1215. Network 1250 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 1260 of FIG. 12 and/or any software configured to perform any subset of the methods described with respect to FIGS. 3, 5, 8A-8B, 10, and/or 11 and/or the functionality discussed in FIGS. 1, 2A-2B, 4, 6A-6B, 7A-7B, and/or 9) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
    receiving, at a processor communicatively coupled to a display, data from a first camera on a perimeter of the display and data from a second camera on the perimeter of the display;
    triangulating, by the processor, a first location of a first light source based on the data from the first camera and the second camera;
    triangulating, by the processor, a second location of a first user based on the data from the first camera and the second camera;

wherein the data from the first camera and the second camera used to triangulate the first location and the second location comprises a separation distance between the first camera and the second camera, respective distances from the respective cameras to the first location and the second location, and respective angles between the separation distance and the respective distances;

determining, by the processor and based on the first location and the second location, that the first user experiences glare from the first light source when viewing the display;

generating, by the processor and in response to determining that the first user experiences glare, a modified screen buffer by modifying pixel values in a glare area of the display; and providing, by the processor, the modified screen buffer to the display, wherein the display is configured to present a screen according to the modified screen buffer.

2. The method according to claim 1, wherein determining that the first user experiences glare further comprises:

calculating, by the processor and based on the first location, a first angle of incidence of the first light source at an incidence point on the display;

calculating, by the processor and based on the first angle of incidence and the incidence point, a reflection ray coincident to the incidence point and having a first angle of reflection, wherein the first angle of reflection is symmetric with respect to the first angle of incidence about a first plane and a second plane;

calculating, by the processor, a line of sight intersecting the display at a viewing point and based on the second location;

determining, by the processor, that an angle between the reflection ray and the line of sight is within a first tolerance, wherein the first tolerance is less than ±5°; and determining, by the processor, that a distance separating the viewing point and the incidence point is within a second tolerance, wherein the second tolerance is less than four inches.

3. The method according to claim 2, wherein the first plane is orthogonal to a front of the display, orthogonal to a side of the display, and coincident to the incidence point, wherein the second plane is orthogonal to the front of the display, parallel to the side of the display, and coincident to the incidence point.

4. The method according to claim 1, wherein determining that the first user experiences glare further comprises:

calculating, by the processor and based on the first location, a first angle of incidence of the first light source at an incidence point on the display;

calculating, by the processor and based on the first angle of incidence and the incidence point, a first angle of reflection, wherein the first angle of reflection is symmetric with respect to the first angle of incidence about a first plane and a second plane;

calculating, by the processor, an angle between a first line intersecting the incidence point and projecting outward from the display according to the first angle of reflection and a second line intersecting the incidence point and the second location; and determining that the angle is within a first tolerance, wherein the first tolerance is less than ±5°.

5. The method according to claim 4, wherein the first plane is orthogonal to a front of the display, orthogonal to a side of the display, and coincident to the incidence point, wherein the second plane is orthogonal to the front of the display, parallel to the side of the display, and coincident to the incidence point.

6. The method according to claim 1, wherein determining that the first user experiences glare further comprises:

calculating, by the processor and based on the second location, a viewing angle and a viewing point on the display;

calculating, by the processor and based on the viewing angle and the viewing point, a reflected viewing angle, wherein the reflected viewing angle is symmetric with respect to the viewing angle about a first plane and a second plane;

calculating, by the processor, an angle between a first line intersecting the viewing point and projecting outward from the display according to the reflected viewing angle and a second line intersecting the viewing point and the first location; and determining that the angle is within a first tolerance, wherein the first tolerance is less than ±5°.

7. The method according to claim 6, wherein the first plane is orthogonal to a front of the display, orthogonal to a side of the display, and coincident to the viewing point, wherein the second plane is orthogonal to the front of the display, parallel to the side of the display, and coincident to the viewing point.

8. The method according to claim 1, wherein the first camera is positioned in a first corner of the display, and wherein the second camera is positioned in a second corner of the display.

9. The method according to claim 8, wherein the first corner is cater-corner to the second corner.

10. The method according to claim 1, wherein the first camera comprises an infrared camera.

11. The method according to claim 1, wherein the first camera comprises a thermal camera.

12. The method according to claim 1, wherein the first camera comprises an optical camera.

13. The method according to claim 1, wherein identifying the first location further comprises:

calculating a first angle between a first line extending between the first camera and the first light source and a second line extending between the first camera and the second camera;

calculating a second angle between a third line connecting the second camera to the first light source and the second line connecting the first camera to the second camera; and calculating a shortest distance from the light source to the second line intersecting both the first camera and the second camera based on the first angle, the second angle, and the separation distance.

14. The method according to claim 13, wherein identifying the first location further comprises:

calculating a first distance between the first camera and the first light source based on the first angle and the shortest distance;

calculating a second distance between the second camera and the first light source based on the second angle and the shortest distance; and generating global coordinates defining the first location and based on a location of the first camera, a location of the second camera, the first angle, the second angle, the first distance, and the second distance.

15. The method according to claim 1, wherein modifying pixel values comprises modifying brightness values of respective pixels in the glare area.

16. The method according to claim 1, wherein modifying pixel values comprises modifying contrast values of respective pixels in the glare area.

17. A system comprising:
   a processor; and
   a computer-readable storage medium communicatively coupled to the processor and storing program instructions which, when executed by the processor, cause the processor to perform a method comprising:
      receiving data from a first camera on a perimeter of a display and data from a second camera on the perimeter of the display;
      triangulating a first location of a first light source based on the data from the first camera and the second camera;
      triangulating a second location of a first user based on the data from the first camera and the second camera;
         wherein the data from the first camera and the second camera used to triangulate the first location and the second location comprises a separation distance between the first camera and the second camera, respective distances from the respective cameras to the first location and the second location, and respective angles between the separation distance and the respective distances;
      determining, based on the first location and the second location, that the first user experiences glare from the first light source when viewing the display;
      generating, in response to determining that the first user experiences glare, a modified screen buffer by modifying pixel values in a glare area of the display; and
      providing the modified screen buffer to the display, wherein the display is configured to present a screen according to the modified screen buffer.

18. A computer program product comprising a computer-readable storage medium having program instructions embodied therewith, wherein the computer-readable storage medium is not a transitory signal per se, the program instructions executable by a processor to cause the processor to perform a method comprising:
   receiving data from a first camera on a perimeter of a display and data from a second camera on the perimeter of a display;
   triangulating a first location of a first light source based on the data from the first camera and the second camera;
   triangulating a second location of a first user based on the data from the first camera and the second camera;
      wherein the data from the first camera and the second camera used to triangulate the first location and the second location comprises a separation distance between the first camera and the second camera, respective distances from the respective cameras to the first location and the second location, and respective angles between the separation distance and the respective distances;
   determining, based on the first location and the second location, that the first user experiences glare from the first light source when viewing the display;
   generating, in response to determining that the first user experiences glare, a modified screen buffer by modifying pixel values in a glare area of the display; and
   providing the modified screen buffer to the display, wherein the display is configured to present a screen according to the modified screen buffer.

* * * * *